United States Patent [19]
Scheuer et al.

[11] 3,951,441
[45] Apr. 20, 1976

[54] ADJUSTABLE PLUMBING FITTING

[75] Inventors: Nicholas G. Scheuer; George J. Flegel, both of Michigan City, Ind.

[73] Assignee: Josam Manufacturing Co., Michigan City, Ind.

[22] Filed: Dec. 12, 1974

[21] Appl. No.: 532,302

Related U.S. Application Data

[63] Continuation of Ser. No. 373,021, June 25, 1973.

[52] U.S. Cl. .................................. 285/391; 285/298
[51] Int. Cl.² ........................................ F16L 15/00
[58] Field of Search ................. 285/42, 56, 58, 298, 285/391, DIG. 2; 85/32 V

[56] References Cited
UNITED STATES PATENTS

| | | | |
|---|---|---|---|
| 296,181 | 4/1884 | Ketcham | 285/298 |
| 505,130 | 9/1893 | Ryan | 285/298 X |
| 1,684,572 | 9/1928 | Boosey | 285/DIG. 2 |
| 2,032,017 | 2/1936 | Hocher et al. | 85/32 V X |
| 2,594,027 | 4/1952 | Jakeway | 85/32 V X |
| 3,301,579 | 1/1967 | Gasche et al. | 285/391 |

*Primary Examiner*—Alfred R. Guest
*Attorney, Agent, or Firm*—P. D. Golrick

[57] ABSTRACT

A cleanout plumbing fitting with two telescoped cylindrical cast parts, the internal part bearing a split ring lodged in and projecting from a cast-in one-turn helical groove to form a male thread; and the external part bearing three equiangularly spaced elongated elements each having a similar series of notches spaced corresponding to the groove pitch with the series successively offset by one-third pitch, forming an interrupted female thread engaged by the male thread for adjustability of the telescoped parts, the latter advantageous even with a cast male thread.

24 Claims, 11 Drawing Figures

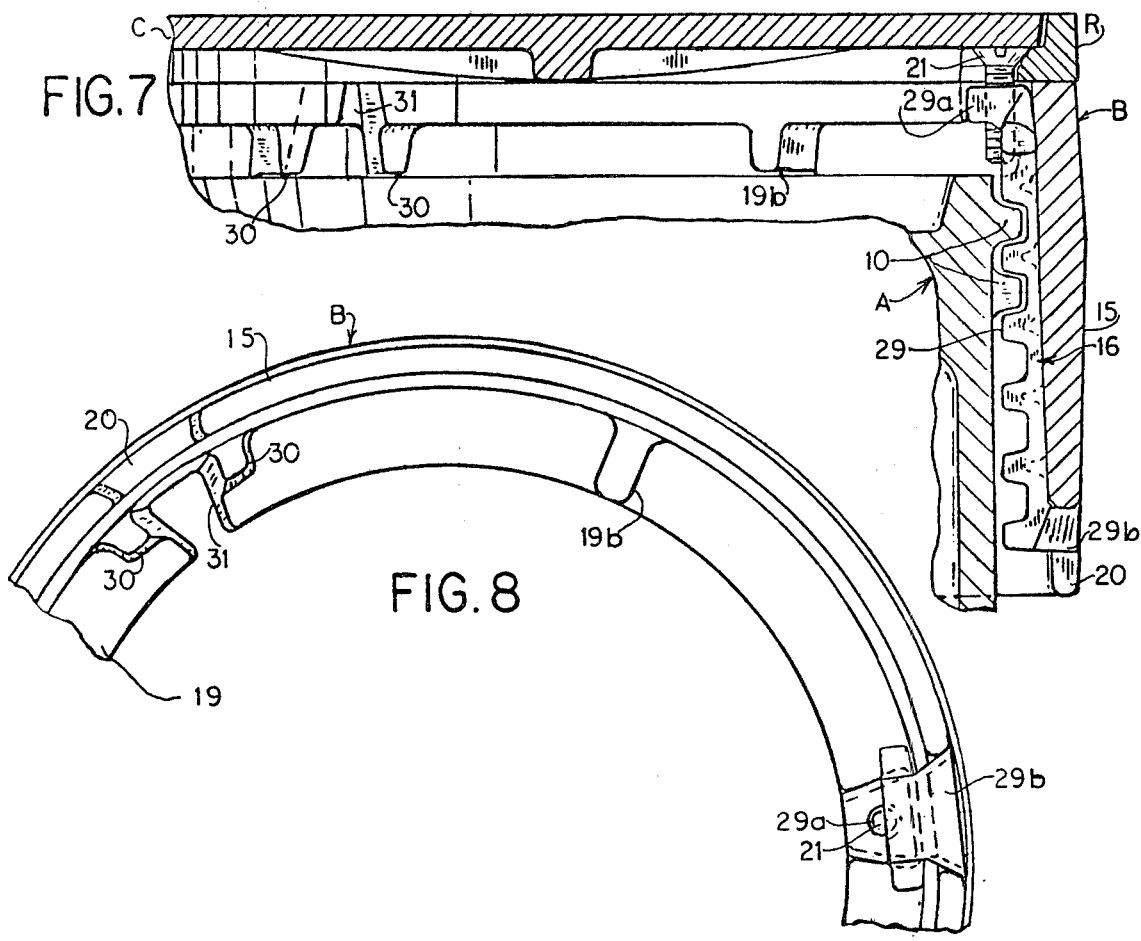
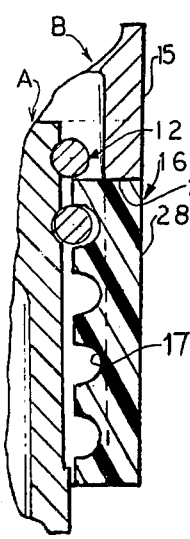
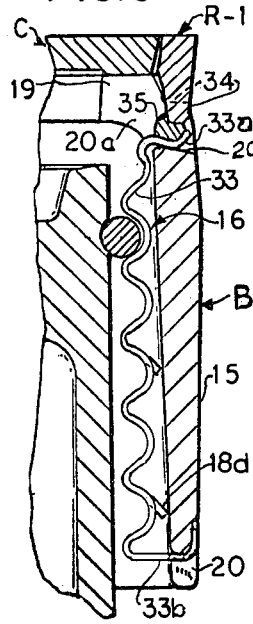
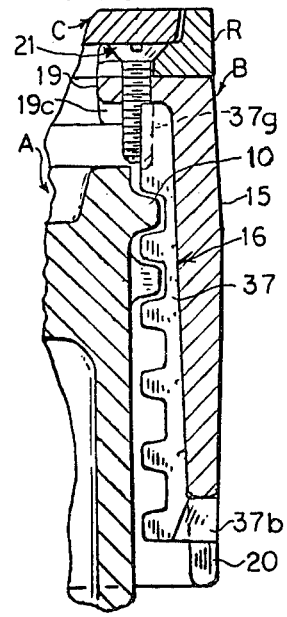
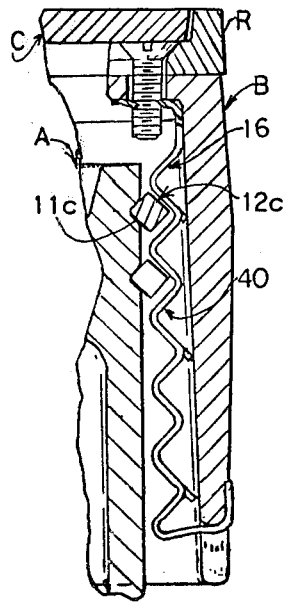

ADJUSTABLE PLUMBING FITTING

This is a continuation of application Ser. No. 373,021, filed June 25, 1973.

Multifarious articles incorporate a pair of cast elements which are telescoped to form a composite structure, for one reason or another adjustable in length. Further means to hold the elements at selected adjusted position or to facilitate the adjustment are desirable in the article, the form of which is usually selected by consideration of minimum functional requirements, the nature of the structural materials, and the economics especially of production operations relative to product price acceptability. A threaded adjustable engagement frequently is advantageous and desirable; for example, for a range of continuous adjustability or for positive engagement between the parts against separation in either axial direction.

To avoid thread-machining costs, for some products prohibitive, especially in plumbing and drainage products the parts have been cast with somewhat loosely engageable "roll" form male and female threads. However, the pattern or molding cost, especially coring, for the cast threads, or the rejection rate for faults in the cast threads, or other fabrication or product problems, have represented disadvantages of cast threads for many applications and have even made them unacceptable for some. Thus in some instances among plumbing and drainage products such as cleanouts and drains, since the elements are finally supported by environmental structure such as surrounding concrete, set screws have been used merely to hold the elements at a selected position; or stepped shoulders have been cast in the female part with cooperating stepped edge formation on an end of the male to afford a selection of stepwise length changes; in each case trading off functional thread advantages for economic advantages.

The present invention provides a structure offering a type of coarser thread engagement between parts, which need not sustain extremely heavy forces across the engaged threads. Though it will be hereinafter described as embodied in a plumbing cleanout or the like where the telescoping parts are cast elements, it is to be understood that what is described for cleanouts has utility in whole or part in other structures; and, indeed, at times can be used advantageously even where castings are not involved.

A male thread is produced either as an integrally cast thread, or by casting an external sprial groove of about one turn in a male cylindrical part to be telescoped, and placing a simple split ring, preferably formed of somewhat resilient round rod stock, in the groove and projecting therefrom to an extent required for the thread height. The female part, on its interior cylindrical surface, is furnished with what is in effect an interrupted female thread by affixing a plurality, usually sufficiently and preferably three, of N equi-angularly spaced generally similar elongated elements each providing a longitudinal series of cross notches spaced correspondingly to the groove pitch, and with the series axially offset one to another by 1/N of the pitch. These may be, for example, formed sheet metal clips or strips or molded plastic components, which by bonding adhesive or mechanical interlocking fasteners are secured to the female part, for the location of which the female part may easily have cast therein appropriate formations at minimum cost.

In contrast to use of cast-in roll threads, this invention, where it is appropriately applied, offers simplicity and lower manufacturing costs, especially in pattern, molding and coring equipment and operations, a saving in cast metal and therefore product weight and cost. Further the simplicity of the structure and comparatively low cost enables use in many products for which cast-in roll threads or even less desirable prior substitutes or alternatives thereto would ordinarily be excluded because of selling price acceptability limitations.

It is then the general object of the present invention to provide a male or female thread structure on a respective larger component involved in a limited threaded engagement at a relatively low cost. Another object is the provision of structure affording a limited threaded engagement between two parts by adapting a male part to receive and dispose a separate element as a limited length male thread, and affixing to a female part a plurality of simple elements in a disposition constituting an interrupted female thread. A still further object is to provide a plumbing or drainage fitting such as an adjustable height cleanout, access fitting or drainage device, including a threaded adjustable engagement of comparatively low cost for the end attained.

Other objects and advantages will appear from the following description and the drawings wherein:

FIGS. 5 and 6 represent a modification for a female thread component element of plastic;

FIGS. 7 and 8 represent a modification with interlock;

FIGS. 9, 10 and 11 are further modifications.

Figure 1:
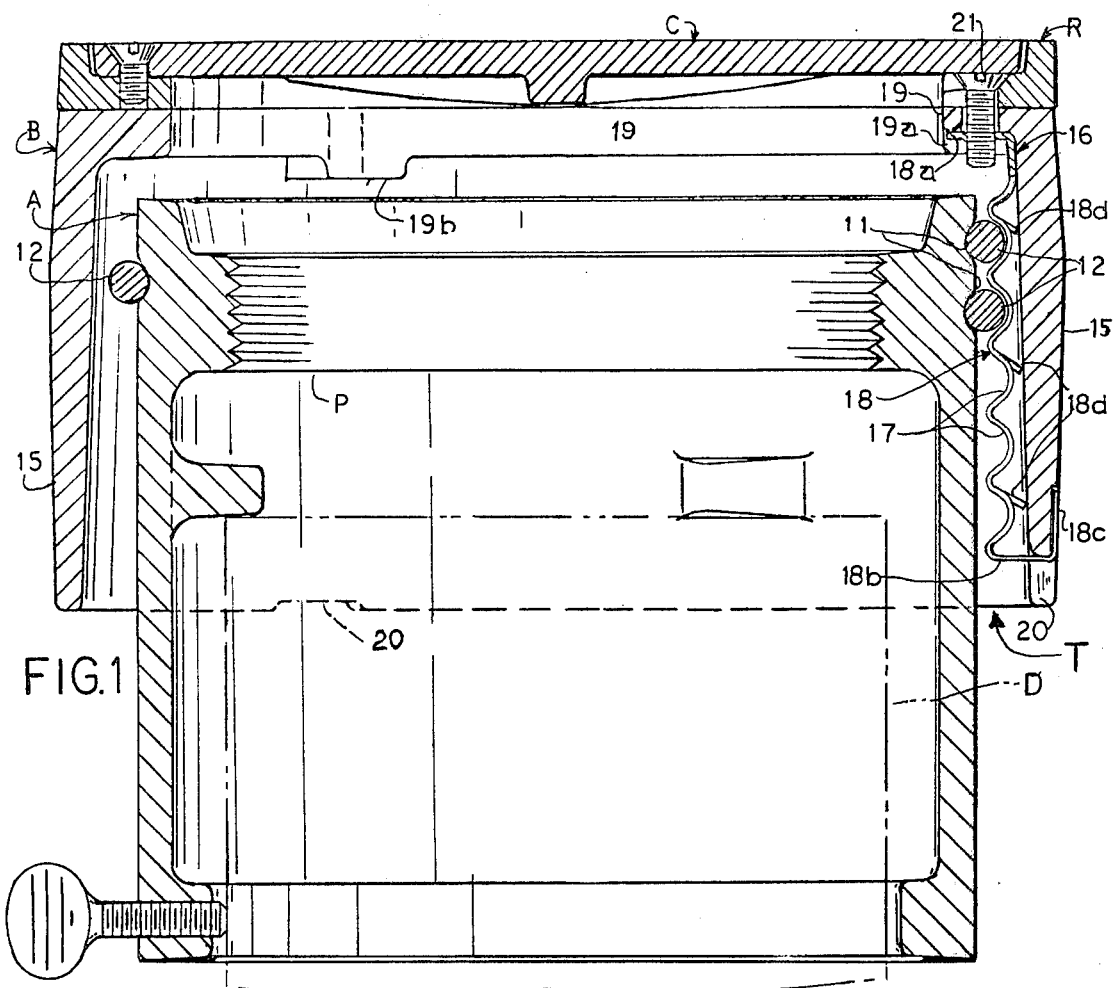
FIG. 1 is a vertical longitudinal or axial section through a cleanout fitting embodying the invention.

In the drawings the invention is disclosed embodied, as one specific application, in a plumbing cleanout, wherein major components, such as a ferrule A and a head B vertically adjustably telescoped along the length of the ferrule, are usually iron castings. The ferrule, or cylindrical male part A, with lower end joined to a drainage line (not shown; indicated by dot-dash lines at D), at its upper end is threaded at P to accommodate a conventional removable closure arrangement (not shown) such as a plug threaded therein with appropriate sealing. The head B, the cylindrical female part, in turn at its flanged upper end supports and is closed by an access cover structure, including cover plate C, and its seat rim R, intended to be disposed flush at the finish level or surface of surrounding environmental structure such as a floor, usually of poured concrete.

Thus the structure comprised of ferrule and head is made composite, so that its length, therefore the level of rim R and cover portion C, may be adjusted as required even though the ferrule location has been fixed by roughing-in operations joining it to the line; and the parts A and B are adjustably threadedly engaged by the thread structure T next discussed.

The ferrule as cast includes an external circumferential spiral groove 11, say about one turn in extent and of desired thread pitch, in which is received the entire length of a split ring 12, projecting radially from the groove and by the spiral shape of the groove held to form a coarse male thread of corresponding pitch. This ring may be fabricated in various ways preferably from round or square rod steel stock to appropriate nominal annular diameter. This diameter, defined as the diameter measured from center to center of the stock, is somewhat greater than the external diameter of the ferrule.

The cross section of the groove is chosen to accommodate the ring stock section; e.g., V-shaped or square bottomed for the two extreme orientations of square stock section; or for round stock, being circularly arcuate, corresponding in radius to the radius of the ring cross section, i.e., the radius of the rod stock, but the depth of the groove is somewhat less than the rod radius so that the ring seated therein markedly projects therefrom. Likewise the ring-receiving female formations are suited to the ring stock, though round stock primarily is shown.

The ring preferably has appreciable springiness, so that with appropriate dimension, i.e., its inside diameter somewhat less than the reduced diameter of the ferrule at the groove bottom, the ring snaps into and is thus self-holding seated in the groove. However, the ring may be adhesively bonded in the groove by known modern adhesives, such as epoxy types, for example, if it is desirable not to rely on spring resiliency for retention, say because a softer spring stock is used; or where rather than removing some groove unevenness, it is preferred to ensure retention in this manner. The ring may be preformed with its ends offset to correspond to the desired pitch, or without the offset of the ends, the groove may be relied upon to establish as well as maintain its pitch.

Since any casting irregularity affecting the male thread will occur in the groove, any desired or necessary removal thereof in a given ferrule casting, will involve grinding or other operation only in the groove; and in any event the male thread surface will be smooth and regular by virtue of its origin in the rod stock.

What is in effect an interrupted female thread is provided on the interior of the cylindrical sleeve or skirt portion 15 of the head part B, by a plurality of similar elongated "notched" elements 16, extending each parallel to the cylinder axis, and secured at locations equiangularly spaced around and on the skirt.

Each element 16 has a series of parallel transverse notches or grooves 17 along its length, with spacing corresponding to the pitch of and width and depth providing a cross-section adapted to receive, the male thread provided by the ring 12. The inside diameter of the skirt 15 of course exceeds the outside diameter of the ferrule by an amount sufficient to accommodate elements 16. Three such notched elements 16 are a preferred minimum; three rather than two for stability of alignment of parts A and B, and three usually giving sufficient area of threaded engagement with the male thread.

With a coarse and somewhat loose thread engagement and relatively narrow width in the elements 16, these grooves 17 may extend straight across the element length rather than being, as they of course can be, shaped to correspond to the spiral angle of the male thread ring, and also the bottoms need not be curved in the direction of the spiral curve. However, it is necessary that the notch series be successively axially offset by 1/N of the pitch of groove 11, that is, the male thread pitch, N being the number of elements 16; thus here one-third with three elements 16 spaced 120° apart.

As a preferred alternative to using three parts having identical axial positioning on the skirt but each differing in notch offset, identical elements 16 are used; and though these could be placed by aid of appropriate jigging equipment at proper angular location, with the requisite offset, and then secured by quick setting adhesive, or by a screw or mechanical fastener means, it is further usually preferable that locating formations be provided in the skirt even as cast.

Several forms of these elements 16 (hereinafter at times termed "female thread elements") and locating structure or formations on the head are here shown in the drawings merely as examples of forms for different materials or modes of affixation. It should be noted that the interrupted female thread aspect of this invention has advantage even when used with an integrally cast one-turn male thread.

Useful in all cases are bottom stop pads 19b engageable with the ferrule end to prevent override on assembly, consequent damage and binding or other later thread malfunctions. A set screw S may be included for holding against rotation and change of height setting made in installation.

In FIG. 1, the female thread element form may be described as a transversely corrugated formed sheet metal clip strip having a body or main length 18 with corrugations providing the grooves 17 separated by intervening somewhat narrower oppositely directed corrugations. At the top end the clip has an inward flange 18a, generally parallel to the inward rim supporting flange 19 of the head H, perforated and stamped to provide an upset single notched thread; and at its bottom an outward flange 18b which at its end is bent back in a lip 18c, parallel to the strip length.

At each angular location for a clip, a recess or notch 20 aptly is provided in the bottom edge of the skirt 15 which embraces and stabilizies the hooked-over bottom end of the clip element, though it here also provides a shoulder of a respectively different depth axially to locate the element to the desired offset; while the top end of the clip is secured by a screw 21 passed through apertures in rim R and flange 19 to engage in the perforate flange 18a suitably threaded in its perforation, either as fabricated, or by use of a self-tapping or sheet metal form for screw 21. Where the shoulders are of different depths in the skirt end recesses 20 to provide the female thread notch offsets, and the clips are identical, the clip top flange 18a will of course be accommodated by correspondingly sized and located integrally cast spacer pads and/or recesses cast on or in the bottom of head flange 19 as at notch 19a at the right side of FIG. 1.

As such a clip is produced by stamping and forming operations, the grooves or corrugations may just as easily be given a slant to correspond to the intended thread spiral angle. So also a curvature transverse to the clip may be given in the grooves to correspond to the spiral external curve. Preferably, to support the clip along its length despite the draft taper of the head interior surface, spurs or lugs 18d are punched or stamped out to project with downwardly progressing greater extent for engaging the wall interior, and in thus compensating for the casting draft angle, to keep each clip vertical.

Figure 2:
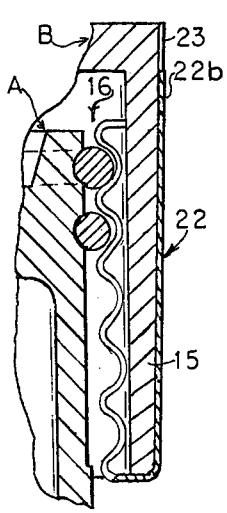
FIG. 2 is a fragmentary sectional detail of a modification of a metal clip forming part of the female thread structure.

In FIG. 2, element 16 is embodied in a sheet metal strip formed to a hairpin or elongated flat-bottomed U-shaped element 22, to be slipped over the bottom edge of skirt 15; and having its inside leg as element 16 corrugated or grooved as described relative to FIG. 1 to present the thread groove 17. The top of the inner leg is bent or flanged toward the skirt for support of the groove shape at the top. A respective flat bottom shallow recess 23 on the outside of the head skirt received and longitudinally embraces the flat outer leg 22b, such recesses then establishing the equiangular spacing of the clips. Preferably at the bottom of each recess 23, again there is a skirt edge recess to provide a pitch offset locating shoulder. Though frictional retention of the clips may be relied upon if the clip stock is stiff enough these may be positively secured by adhesive bonding.

Figure 3:
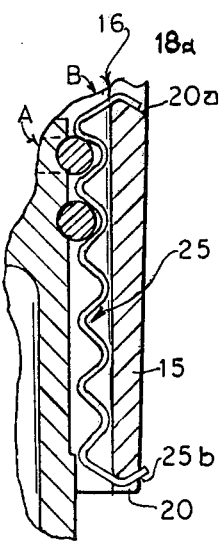
FIG. 3 is similar to FIG. 2 for a further modification in a female thread component structure.

In FIG. 3 another female thread component form is shown, again a clip 25 of formed metal, similar to that of FIG. 1, having a bottom end 25b embraced by, and hooked over an offset determining bevel shoulder of, a respective skirt bottom edge, recess 20; but at its top 18a outwardly bent to hook over a beveled shoulder afforded by a recess or notch, or other apertures 20a cast in the top region of the head. Here the shoulder depth at the top recesses 20a varies from one clip to another corresponding to the change at 20b for offset purposes. In addition to the mechanical clip interlock thus provided, again for greater security adhesive bonding may be used.

Especially for application involving only light loading during handling and installation, round wire stock may be used to provide elements formed to longitudinal shapes similar to those described for the strip sheet metal forms, e.g., the shape of FIG. 1. In such case, each said element is a steel wire element multiply reflexly bent in one plane to a wavy or serpentine form with crests alternating with troughs affording said series of notches.

Figure 4:
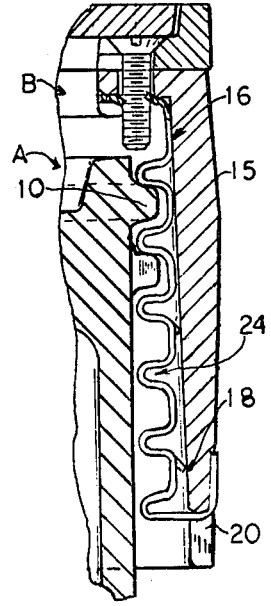
FIG. 4 shows a further female component modification.

In FIG. 4, the female thread component 24 is again a sheet metal clip form, generally similar to that of FIG. 1 excepting that the grooves are flat bottomed with walls slightly sloping out of the bottom, to receive the nearly square shaped one-turn male thread 10 here appearing as integrally cast on the ferrule A.

Figure 5:
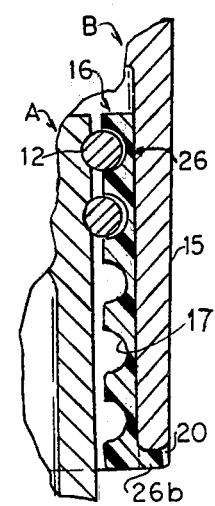

In FIG. 5, the element 16 is embodied in a molded plastic strip 26 of elongated rectangular form, with the grooves or notches 17 molded therein, which thus may have groove curvatures and slants as desired; and an outward bottom end lip 26b, again to be embraced by, and to engage an offset determining shoulder in, a respective skirt end recess 20; the strip being adhesively bonded to the skirt.

FIG. 6 shows a simple but heavier block form of plastic female thread element or insert 28, which over its entire length is longitudinally embraced and adhesively bonded in a respective slot extending upward from the skirt bottom edge to a shoulder 20c establishes the desired pitch offset for the series of the molded in grooves 17.

In FIGS. 7–8, a precision cast, say die cast, female thread element 29 has a groove shape similar to that of FIG. 4, for receiving the somewhat square-shaped integrally cast male thread 10 on the ferrule; and has its back surface of the element shaped to conform to the interior of the wall of the adjustable head, especially to the wall draft or taper as well as curvature. The skirt has for each clip a bottom recess 20, providing as previously positioning shoulders of successively different heights to establish pitch. Each such bottom recess has upwardly convergent and outwardly divergent side margins to receive a bottom dovetail lug or projection 29b of corresponding shape. The flange 19 of the head B, in addition to the stop lugs 19b previously described for FIG. 1, at each female thread element location has paired dependent cast lugs 30 providing continuation of the sidewalls of a respective notch or interruption 31 in the flange 19. To receive the mating shaped top end of clip or element 29, these structures 30 and 31 form a dovetail socket (see especially the left side of FIG. 8, a fragmentary bottom view of the head, where element 29 is omitted for clarity as also at the corresponding location in FIG. 7) Moreover, with the bottoms of the lugs 30 at different heights corresponding to the differences amongst the shoulders in recesses 20, by engagement with shoulders at either side of the screw-engaged clip top lug or flange 29a, there is further support, supplementing the engagement at 29b and 20 for the pitch setting. Thus the element is firmly supported at top and bottom as well as along its length when drawn up into position against the shoulder of recess 20, by the screw 21.

It may be noted here that by use of the variously disclosed female thread components, even with cast male threads, a clear advantage is attained. For since only one of the cooperating threads is a cast thread, casting tolerances on that one thread form are not so critical, inasmuch as there is no problem, as in the situation where both threads are cast, of possibility of having two cooperating parts both of which have been cast over tolerance in the direction leading to interference.

In FIG. 9, the formed steel sheet clip 33 is similar to that of FIG. 3 in its general form. As in FIG. 3, the top of the head B is downwardly recessed at 20a into and through its flange to provide a top shoulder engaged by clip flange 33a for establishing the clip position in conjunction with the engagement of the bottom flange 33b with the shouldered recess 20; the bottom clip flange shape and skirt recess accommodation, however, being quite close to what was shown and described for FIG. 1.

Here, however, the outer margin of the head flange 19 is relieved, as it were rabetted, to receive the bottom edge of the simple cylindrical or ring-form finish rim R-1, provided with three 120° equi-spaced downward projections 34, which have different lengths (corresponding to the respective recess shoulder depths) to extend down toward a similar relation to the respective clip top flanges 33a. The finish rim is adhesively bonded in the groove to and so also the retained clip top in the head as by a high strength epoxy cement 35. In this case the cover directly bears on and is secured to the flange 19 by screws (not shown) such as screws 21 in prior figures. Thus securing screw engagement with the metal clip is eliminated while yet providing strong support for the top end engagement with the head.

In FIG. 10, another form of molded plastic or die-cast female element 37 is shown having a bottom end dovetail lug 37b engaged in a corresponding notch generally similar to that shown and described for FIGS. 7–8; but with the differences that the underside of the head flange 19 has integrally cast recess — or if needed pad-formations as at 19c providing at diverse levels stop surfaces for the top ends of the elements, being again at equal distances from the respective shoulders in the corresponding bottom notches 20; and further that the top end of each element 37 is retained by screw 21 engaged in a semi-circular vertical groove 37g on its inside face, whereby the element top end is drawn up but especially compressed outwardly against the interior of the skirt wall.

In FIG. 11, the general form of the clip 40 and of the cooperating parts of the head B are quite similar to those of FIG. 1 excepting that the clip grooves are triangular, i.e., V-shaped, to accommodate a split ring male thread element 12c, formed form square rod stock disposed with diagonal of the square section perpendicular to the axis; and a shallow corresponding V-shaped groove 11c then being cast into the ferrule.

From the aforegoing it is readily seen that considerable variation is possible of details of even this one application of the invention. Clearly other variations within the invention are possible for other materials of construction and other applications; and especially in the form of the individual female thread inserts or components, and cooperating locating structure on the head or other telescope female part of an adjustable joint.

What is claimed is:

1. A plumbing or drainage fitting, comprising
a cast metal male component having a cylindrical external surface,
a female component having a cylindrical, internal surface telescoped over the male component, and
a thread structure providing an axially adjustable engagement between said components including a female thread on the female component, and a male thread,
said male component having in its external cylindrical surface a cast-in spiral groove of about one turn, and a split ring received over its length in, and held partially radially projecting by, said groove to form the said male thread of desired pitch.

2. A fitting as described in claim 1, wherein
said female component comprises a casting and is provided on its internal cylindrical surface with means forming said female thread as an interrupted female thread.

3. A fitting as described in claim 2, wherein
said female component bears, as said means on its cylindrical internal surface, an N-fold plurality of similar elongated elements distinct from the casting comprising the female component, each said element having a series of transverse notches successively spaced along its length with a spacing corresponding to the pitch of said spiral groove and adapted to engagement by a portion of the projecting ring,
said elements extending substantially parallel to, and equiangularly spaced about, the axis of the female component, and having the said series successively axially offset from one to another by 1/N of said pitch.

4. A fitting as described in claim 3, wherein N is 3.

5. A fitting as described in claim 3, wherein
said elements are identical and longitudinally offset from one to another to provide the described offset of the notch series.

6. A fitting as described in claim 5, wherein
said female component has cast-in formations to locate said elements at respective equiangularly spaced locations.

7. A fitting as described in claim 5, wherein
said female component has cast-in formations for cooperation with said elements to position them with said axial offset.

8. A fitting as described in claim 6, wherein
said elements are formed metal clips having a top end screw-secured to said female component.

9. A fitting as described in claim 6, wherein
said elements are molded plastic elements adhesively bonded in position on said female component.

10. A fitting as described in claim 5, wherein
each said element is a steel wire element multiply reflexly bent in one plane to a wavy or serpentine form with crests alternating with troughs affording said series of notches.

11. A plumbing or drainage fitting, comprising
a cast metal male component having a cylindrical external surface,
a female component comprising a casting having a cylindrical, internal surface telescoped over the male component, and
a thread structure providing an axially adjustable engagement between said components including on the external cylindrical surface of said male component, a one-turn male thread of desired pitch, and on the internal cylindrical surface, of said female component, means distinct from the casting forming an interrupted female thread;
said female component bearing as said means, an N-fold plurality of similar elongated elements each having a series of transverse notches successively spaced along its length with a spacing corresponding to the said pitch and adapted to engagement by a portion of the male thread;
said elements extending substantially parallel to, and equiangularly spaced about, the axis of the female component, and having the said series successively axially offset from one to another by 1/N of said pitch.

12. A fitting as described in claim 11, wherein
said elements are identical and longitudinally offset from one to another to provide the described offset of the notch series.

13. A fitting as described in claim 12, wherein N is 3.

14. A fitting as described in claim 12, wherein
said female component has cast-in formations to locate said elements at respective equiangularly spaced locations, and for cooperation with said elements to position them with said axial offset.

15. A fitting as described in claim 14, wherein
said elements are formed sheet metal clips each having a plurality of longitudinally spaced stamped-out lugs of downwardly progressively greater projection from the backs thereof, to engage the internal female surface of the female component to compensate for draft angle and maintain the clips vertical.

16. A fitting as described in claim 14, wherein
said elements are molded plastic elements adhesively bonded in position on said female component.

17. A fitting as described in claim 14, wherein
said elements are molded plastic or precision cast elements each having a back side shaped to mate with the concavity and any casting draft of the internal cylindrical surface of the female component, and each havng a bottom dovetail-like lug engaged in a complementarily shaped formation in the bottom edge of the female component.

18. A fitting as set forth in claim 14, wherein
said male thread is cast integrally with said male component.

19. A fitting as described in claim 14, which is a cleanout fitting wherein
said male component is a ferrule attachable at its bottom end to a drainage pipe with said male thread located near the top end of the ferrule; and
said female component is an adjustable head having a skirt portion providing said internal surface;
said skirt having a top inward peripheral flange providing a seat for a cover.

20. A cleanout fitting as described in claim 19, wherein
said skirt has a top peripheral outer groove, and top notches downward below the level of the groove, receiving projections of respective said elements;
and a finish rim with lugs depending into said top notches toward respective said projections, said finish rim adhesively bonded in said groove and to said projections.

21. An adjustable threaded joint, comprising
a male component having a cylindrical external surface;
a female component having a cylindrical, internal surface telescoped over the male component; and
a thread structure providing an axially adjustable engagement between said components and including a male thread structure provided by
said male component having in its external cylindrical surface a spiral groove of about one turn, and a split ring received over its length in, and held partially radially projecting by, said groove to form the said male thread of desired pitch.

22. An adjustable threaded joint as described in claim 21, wherein
said female component is provided, on its internal cylindrical surface, with means forming an interrupted female thread.

23. A fitting as described in claim 22, wherein
said female component bears, as said means on its cylindrical internal surface, an N-fold plurality of similar elongated elements each having a series of transverse notches successively spaced along its length with a spacing corresponding to the pitch of said spiral groove and adapted to engagement by a portion of the projecting ring,
said elements extending substantially parallel to, and equiangularly spaced about, the axis of the female component, and having the said series succcessively axially offset from one to another by 1/N of said pitch.

24. An adjustable threaded joint, comprising
a male component having a cylindrical external surface;
a female component having a cylindrical, internal surface telescoped over the male component; and
a thread structure providing an axially adjustable engagement between said components and including on the external cylindrical surface of said male component, about a one-turn male thread of desired pitch, and on the internal cylindrical surface of said female component means distinct from the female component forming an interrupted female thread;
said female component bearing, as said means, an N-fold plurality of similar elongated elements each having a series of transverse notches successively spaced along its length with a spacing corresponding to the said pitch and adapted to engagement by a portion of the male thread;
said elements extending substantially parallel to, and equiangularly spaced about, the axis of the female component, and having the said series successively axially offset from one to another by 1/N of said pitch.

* * * * *